ись

(12) United States Patent
Hill et al.

(10) Patent No.: US 7,275,908 B2
(45) Date of Patent: Oct. 2, 2007

(54) SWIVEL RAM ROLLER

(75) Inventors: David A. Hill, Brielle, NJ (US); Jeffrey A. Kinsberg, Matawan, NJ (US)

(73) Assignee: Hilman, Incorporated, Marlboro, NJ (US)

( * ) Notice: Subject to any disclaimer, the term of this patent is extended or adjusted under 35 U.S.C. 154(b) by 488 days.

(21) Appl. No.: 10/760,580

(22) Filed: Jan. 21, 2004

(65) Prior Publication Data

US 2005/0158159 A1  Jul. 21, 2005

(51) Int. Cl.
*B66F 9/14* (2006.01)

(52) U.S. Cl. ............... 414/669; 414/495; 414/661; 254/2 B; 254/3 C; 254/5 C; 254/11; 254/93 L; 187/243; 187/244

(58) Field of Classification Search ............ 414/495, 414/661, 669, 678; 254/2 B, 3 C, 11, 89 H, 254/93 L, 5 C; 104/35, 45, 47; 105/28, 105/275, 455; 187/243, 244
See application file for complete search history.

(56) References Cited

U.S. PATENT DOCUMENTS 1,486,784 A * 3/1924 Mingo .................. 254/418
1,997,327 A * 4/1935 Warshaw ................ 280/43.12
3,881,426 A * 5/1975 Long ......................... 105/28
4,200,424 A * 4/1980 Gerkey et al. ........... 414/744.6
5,151,004 A * 9/1992 Johnson ..................... 414/495

FOREIGN PATENT DOCUMENTS

FR  2581634 A1 * 11/1986 ................ 254/2 B

* cited by examiner

*Primary Examiner*—David H. Bollinger
*Assistant Examiner*—M. S Lowe
(74) *Attorney, Agent, or Firm*—Oliff & Berridge, PLC (57) ABSTRACT

A roller mechanism for transporting loads over a surface, the roller mechanism including a body, at least one roller assembly that permits the body to move in at least one translational direction, the roller assembly being rotatably connected to the body, and a lifting mechanism attached to the body such that the body is selectively rotatable relative to the lifting mechanism, wherein the lifting mechanism can be operated to lift the roller assemblies out of contact with the surface.

19 Claims, 5 Drawing Sheets

SWIVEL RAM ROLLER

BACKGROUND OF THE INVENTION

1. Field of Invention

This invention relates generally to rollers for transporting heavy loads. More particularly, the invention relates to rollers for transporting heavy loads having roller chains, wheels or other mechanisms which permit translational movement.

2. Description of Related Art

Heavy loads are often moved using a ram roller or a plurality of ram rollers. These ram rollers typically include a housing with a flat top surface and at least one roller assembly. These roller assemblies can be, but are not limited to, chain rollers. The load is placed on the flat top surface of the ram roller. The load is then moved in the translational direction of the ram roller by applying a pulling or pushing force on the load or the ram roller.

However, these ram rollers can only move in one translational direction. In order to move the load in a second translational direction, i.e., a translational direction different from the ram roller's current translational direction, the ram roller, specifically the roller assembly(ies), must be repositioned and redirected in the desired second direction. However, unnecessary delays and complications may result from the repositioning of the ram roller, especially when it bears a load.

In fact, when a ram roller bears a heavy load, a plurality of steps must be taken to reposition the roller. First, a lifting mechanism (i.e., a jack) is placed under the load and operated to lift the load off of the ram roller. After the load has been lifted off of the ram roller, the load is then "blocked," or independently supported, to prevent the load from dropping. After the load has been properly and safely blocked, the lifting mechanism is removed and the ram roller is manually rotated until it is directed in the desired direction. Thereafter, the lifting mechanism is again reinserted to hold the load, the blocks are removed, and the load is then lowered by the lifting mechanism back onto the ram roller. The ram roller and load can then be moved in the new translational direction.

Obviously, a significant amount of time and effort is required to perform the above steps. Further, these steps increase the risks of damage to the load and of injury to workers conducting these steps.

SUMMARY OF THE INVENTION

To address these problems, this invention provides a swivel ram roller in which the load lifting mechanism is integrated with the ram roller assembly. This reduces the amount of time and effort necessary in order to change the direction of a swivel ram roller.

The invention, according to one exemplary aspect, includes a roller mechanism for transporting loads over a surface, including a body, at least one roller assembly that permits the body to move in at least one translational direction, the roller assembly being rotatably connected to the body, and a lifting mechanism attached to the body such that the body is selectively rotatable relative to the lifting mechanism, wherein the lifting mechanism can be operated to lift the roller assemblies out of contact with the surface.

The invention, according to another exemplary aspect, includes a roller mechanism for transporting loads over a surface, including a body, at least one roller assembly that permits the body to move in at least one translational direction, the roller assembly being rotatably connected to the body, and a lifting mechanism attached to the body such that the body is selectively rotatable relative to the lifting mechanism and the lifting mechanism can be operated to lift the body and the at least one roller from the surface.

The invention, according to another exemplary aspect, includes a roller mechanism for transporting loads over a surface including a body, at least one roller assembly that permits the body to move in a translational direction, the at least one roller assembly being rotatably connected to the body, and a lifting mechanism, wherein the lifting mechanism has a retracted state in which the lifting mechanism does not contact the surface and an extended state in which the lifting mechanism contacts the surface and supports the body and the roller assembly above the surface, wherein the body and the roller assembly are rotatable relative to the lifting mechanism when the body and the roller assembly are not in contact with the surface.

The invention, according to another exemplary aspect, includes a method of operating a roller mechanism on a surface, the roller mechanism having a body, at least one roller assembly for moving the body in at least one translational direction over the surface, the roller assembly being rotatably connected to the body and a lifting mechanism, including lifting, with the lifting mechanism, a load that has been placed on the roller mechanism by a predetermined distance, lifting, with the lifting mechanism after the load has been lifted the predetermined distance, the load, the body and the at least one roller assembly until the at least one roller assembly is out of contact with the surface, and rotating the body relative to the lifting mechanism.

BRIEF DESCRIPTION OF THE DRAWINGS

Various embodiments of this invention will be described in detail with reference to the following figures, wherein.

DETAILED DESCRIPTION OF EXEMPLARY EMBODIMENTS

Referring now in detail to the drawings, there is illustrated, in FIGS. 1-6, a swivel ram roller of one embodiment of the invention.

Figure 1:
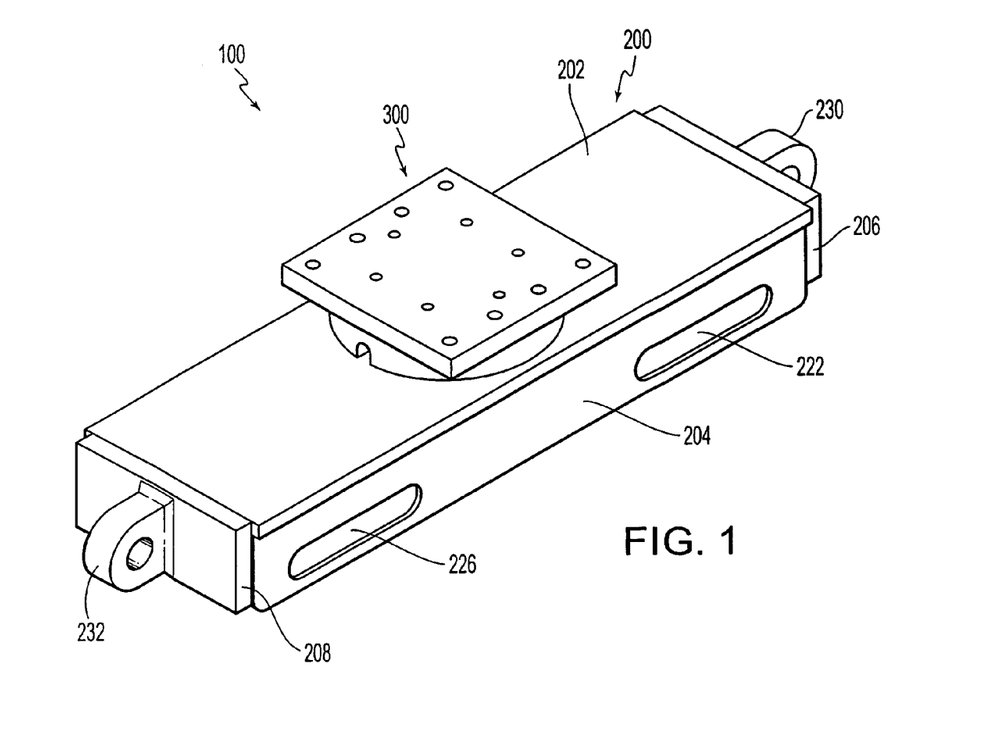
FIG. 1 is an overall, perspective view of the swivel ram roller assembly according to a first embodiment of the invention.
Figure 2:
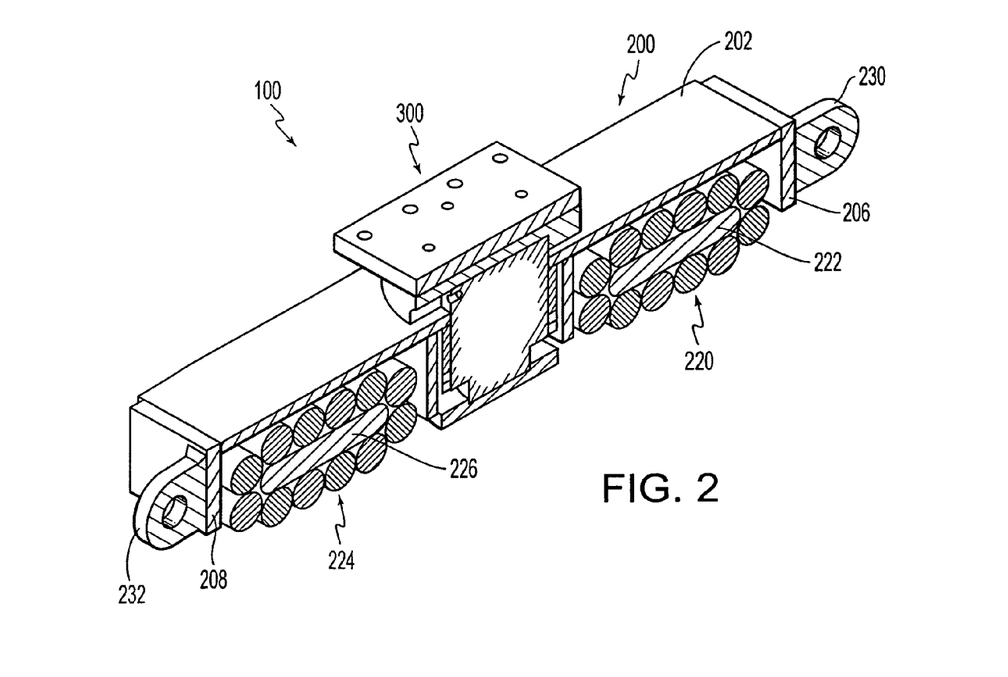
FIG. 2 is a perspective, partially cross sectional view of the swivel ram roller assembly of FIG. 1.
Figure 3:
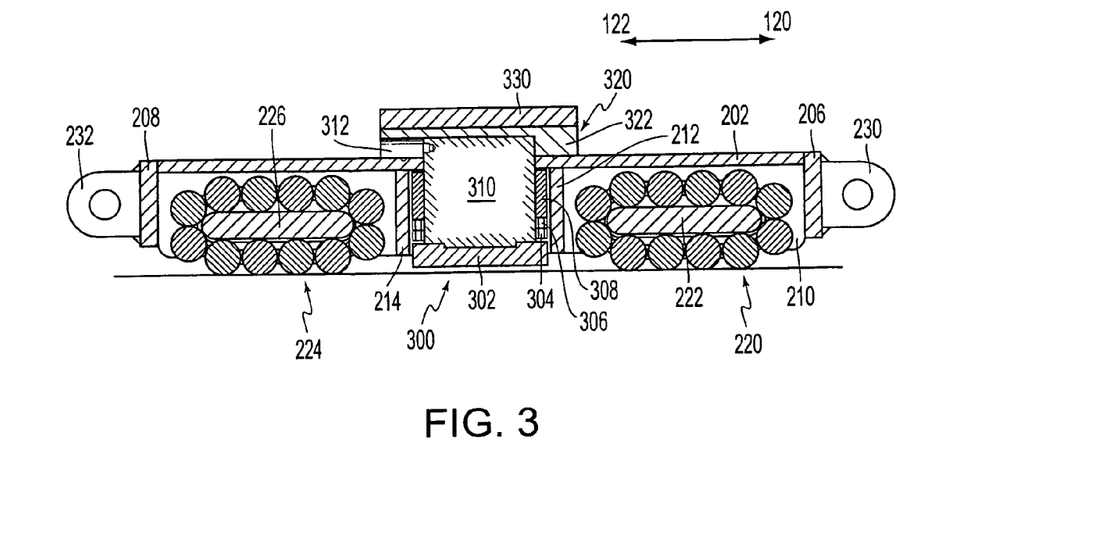
FIG. 3 is a front view of the swivel ram roller assembly of FIG. 1, with the side plate 204 removed, showing the swivel ram roller assembly in the retracted position.

Specifically, FIGS. 1-6 show a swivel ram roller 100 with a body 200 and a lifting mechanism 300. As shown in FIGS. 1-3, the body 200 includes a top wall 202, side walls 204, 206, 208 and 210, roller assemblies 220, 224, axle assemblies 222, 226 for the roller assemblies 220, 224 and tabs 230, 232. The top wall 202 is located on top of and connects the side walls 204, 206, 208 and 210 (the respective ends of the side walls 204, 206, 208 and 210 may also be connected). The tabs 230, 232 are located on an outside surface of the side walls 206, 208 and include an opening. The tabs 230, 232 can be engaged by a hook, rope, chain, cable or other mechanism to move the swivel ram roller 100.

The roller assemblies 220, 224 are located within the side walls 204, 206, 208 and 210 and below the top wall 202. As shown, the roller assemblies 220, 224 are chain roller assemblies which are rotatable about the axle assemblies 222, 226, respectively. The axle assemblies 222, 226 are attached to the side walls 204, 210. Roller assemblies such as roller assemblies 220, 224 and axle assemblies such as axle assemblies 222, 226 are common and well known in the industry, and thus are not described in detail. The roller assemblies 220, 224 rotate in two directions, clockwise and counterclockwise, from the perspective of FIG. 3, such that the swivel ram roller 100 can move in opposite directions 120, 122. In other embodiments, the roller assembly can be a wheel with a central axle attached to the side walls 204, 210, or a plurality of wheels. In yet other embodiments, any other types of wheel or roller arrangement which enable translational movement of the swivel ram roller 100 can be utilized.

The body 200 also includes internal walls 212, 214 which are between the roller assemblies 220, 224 and the lifting mechanism 300, and below the top wall 202. The internal walls 212, 214 extend between and are connected on their ends to the side walls 204, 210. Internal walls 212, 214 partially house the lifting mechanism 300 to prevent large debris from contacting the lifting mechanism 300. As should be appreciated, any suitable wall, divider or shield can be used to prevent large debris from contacting or interfering with the lifting mechanism 300. In yet other embodiments, such walls, dividers or shields can be omitted.

As shown in FIGS. 3-6, the lifting mechanism 300 includes, from bottom to top, a foot 302, nuts 304, 306, a lift ring 308, a hydraulic cylinder 310, a swivel disk 320 and a top plate 330. The top of the foot 302 is attached to or integral with the bottom of the hydraulic cylinder 310. As shown in FIG. 3, the foot 302 is positioned a predetermined distance away from the ground when the lifting mechanism 300 is in the retracted position so that the foot 302 does not interfere with the movement of the swivel ram roller 100.

The nuts 304, 306 are attached to or integral with an outer surface of the hydraulic cylinder 310 above the foot 302. The nuts 304, 306 attach the lift ring 308 to the hydraulic cylinder 310. In other embodiments, only one nut is used. Also, in yet other embodiments, a clamp can be used. As should be appreciated, any combination of nuts, washers, clamps or other retaining devices can be used in order to attach the lift ring 308 to the hydraulic cylinder 310. As should also be appreciated, the nuts 304, 306 or other retaining device, lift ring 308 and hydraulic cylinder 310 can be formed as one unit capable of supporting and lifting the body 200 and a load, as discussed below.

Figure 4:
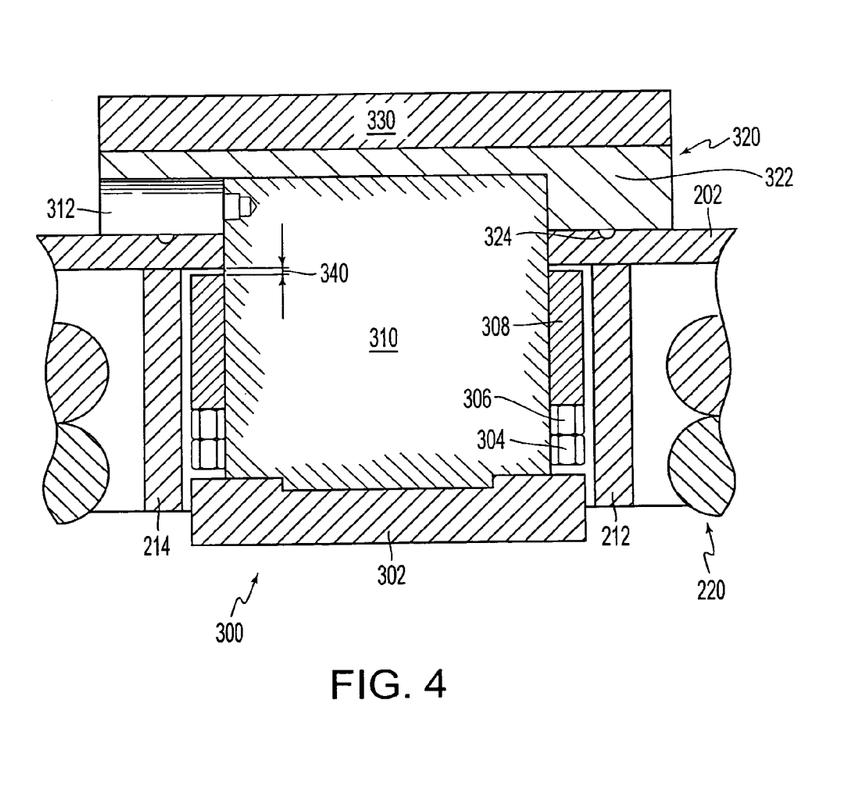
FIG. 4 is an enlarged view of the lifting mechanism of the swivel ram roller of FIGS. 1-3 in the retracted position.

As shown in FIGS. 3 and 4, the top surface of lift ring 308 is a predetermined distance 340 below the bottom surface of the top wall 202 when the hydraulic cylinder 310 is in the retracted position. As also shown in FIGS. 3 and 4, the lift ring 308 surrounds the entire outer surface of the hydraulic cylinder 310. However, as should be appreciated, the lift ring 308 can obviously partially surround the outer surface of the hydraulic cylinder 310, or can be replaced by fingers, flanges or other structural members which can selectively engage the top wall 202, as discussed below.

As shown in FIG. 4, the top part of the hydraulic cylinder 310 extends above the top wall 202. A hydraulic connection 312, located in the swivel disk 320, is connected to the hydraulic cylinder 310 above the top wall 202. Hydraulic fluid is received from a hydraulic source 400 (FIGS. 7-11), through the hydraulic connection 312, by the hydraulic cylinder 310 to increase the hydraulic pressure in the hydraulic cylinder 310. Conversely, hydraulic fluid is returned to the hydraulic source 400, through the hydraulic connection 312, from the hydraulic cylinder 310 to reduce the hydraulic pressure in the hydraulic cylinder 310. As should be appreciated, the hydraulic cylinder 310 can be any currently available or later developed hydraulic cylinder that can move between two positions, namely, an extended position and a retracted position. In this regard, the hydraulic cylinder 310 can be a single acting or a double acting cylinder. If the hydraulic cylinder 310 is a double acting cylinder, two hydraulic connections 312 are located in swivel disk 320. Obviously, any currently available or later developed lifting device can also be used that can also move between an extended position and a retracted position.

The swivel disk 320 is attached to or integral with the top part of the hydraulic cylinder 310. The swivel disk 320 covers the top of the hydraulic cylinder 310. As shown in FIGS. 3 and 4, the swivel disk 320 includes a side wall 322 that extends to the top of the top wall 202 when the hydraulic cylinder 310 is in the retracted position. In other words, as shown in FIG. 4, the swivel disk 320 covers the top of the hydraulic cylinder 310 and is in contact with the top wall 202 when the hydraulic cylinder 310 is in the retracted position.

When the hydraulic cylinder 310 is in the retracted position, the foot 302 is a predetermined distance above the ground. Specifically, as discussed, the swivel disk 320 is attached to or integral with the top of hydraulic cylinder 310 and the foot 302 is attached to, or integral with the bottom of hydraulic cylinder 310. Thus, when the hydraulic cylinder 310 is in the retracted position, the swivel disk 320 is supported by the top wall 202, and the foot 302 is maintained a predetermined distance above the ground by the hydraulic cylinder 310.

The swivel disk 320 also includes a plurality of projections 324 that extend downwardly from the bottom surface of the swivel disk 320. The plurality of projections 324 match and are received by a plurality of detents 220 that are formed in the top surface of the top wall 202. The plurality of projections 324 are received in the plurality of detents 220 in order to prevent the lifting mechanism 300 from rotating independently relative to the body 200 when the lifting mechanism 300 is in the retracted position. In other embodiments, the plurality of projections extends upwardly from the top of the top wall 202 and are received by a plurality of detents in the bottom surface of the swivel disk 320. Also, in yet other embodiments, a clamp can be used. As should be appreciated, any combination of nuts, washers, clamps or other retaining devices can be used in order to maintain the position of the lifting mechanism 300 relative to the body 200 when the lifting mechanism 300 is in the retracted position.

The top plate 330 is attached to or integral with the top of the swivel disk 320. The top plate 330 is placed on top of the swivel disk 320 to receive a load. As should be appreciated, any load receiving structure can be placed on top of or otherwise attached to the swivel disk 320. In other embodiments, the load receiving structure is omitted and loads are thus placed directly on the swivel disk 320.

As shown in FIGS. 3 and 4, when a load is placed on the top plate 330 with the swivel ram roller in the retracted state, the force due to the load is transmitted from the top plate 330 to the swivel disk 320, to the body 200, and to the roller assemblies 220, 224. Also, the swivel disk 320 remains in a fixed rotational position with respect to the body 200 because the projections 324 of the swivel disk 320 engage the detents 220 in the top plate 202.

Figure 5:
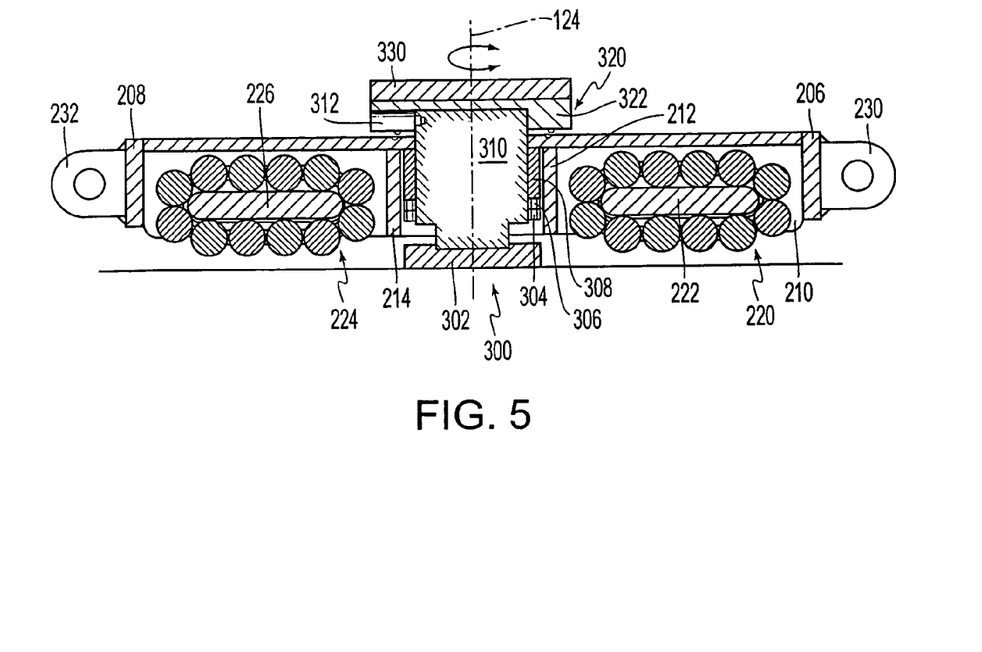
FIG. 5 is a front view of the swivel ram roller assembly of FIG. 1, with the side plate 204 removed, showing the swivel ram roller assembly in the extended position.
Figure 6:
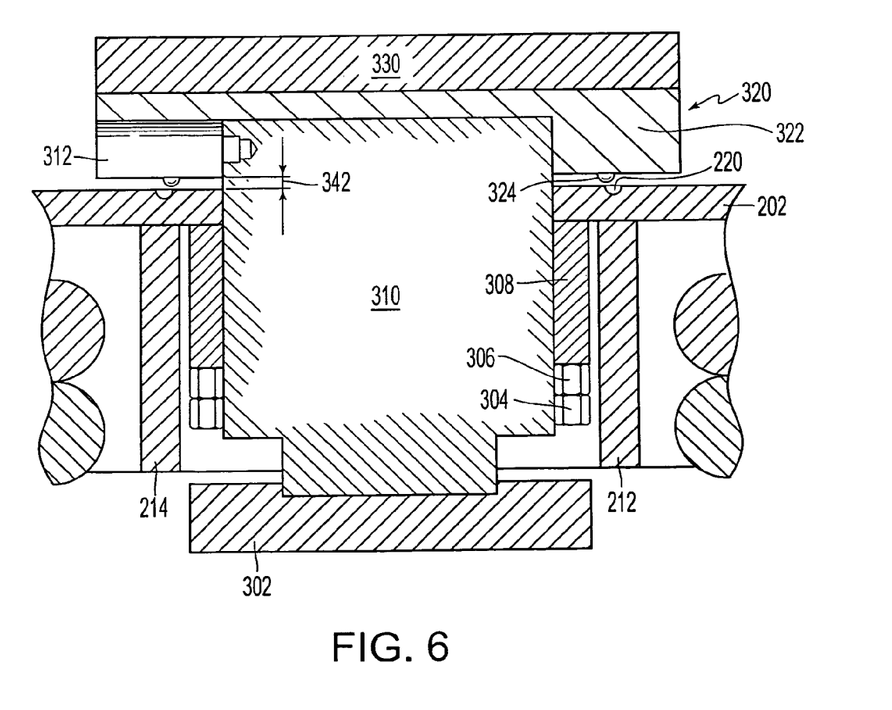
FIG. 6 is an enlarged view of the lifting mechanism of the swivel ram roller of FIGS. 1-5 in the extended position.

A description will now be provided of the transformation of the swivel ram roller 100 from a retracted state, as shown in FIGS. 3 and 4, to an extended state, as shown in FIGS. 5 and 6. Hydraulic fluid is passed to the hydraulic cylinder 310 from the hydraulic source 400, via the hydraulic connection 312, to increase the hydraulic pressure in the hydraulic cylinder 310. When the hydraulic pressure is sufficiently increased, the hydraulic cylinder 310 initially extends downward until the foot 302 contacts the ground. When the foot 302 contacts the ground, the force due to the load switches to be borned by the hydraulic cylinder 310 and foot 302 instead of the body 200 and the roller assemblies 220, 224.

After the foot 302 contacts the ground, a further increase in the hydraulic pressure causes the hydraulic cylinder 310 to extend upward. When the hydraulic cylinder 310 first extends upward, only the swivel disk 320 and the top plate 330 are moved upward with the hydraulic cylinder 310. In other words, the body 200 is not moved upward when the hydraulic cylinder 310 first extends upward. As should be appreciated, when the swivel disk 320 and the top plate 330 initially move upward, the force due to the load is entirely transferred from the swivel disk 320 to the hydraulic cylinder 310 and the foot 302. In other words, the force due to the load is no longer borne by the body 200 and the roller assemblies 220, 224.

The swivel disk 320 and the top plate 330 first move upward with the hydraulic cylinder 310 by the predetermined distance 340. As discussed, during this movement, only the swivel disk 320 and the top plate 330 move upwardly with the hydraulic cylinder 310. As also discussed above, the predetermined distance 340 is the distance between the top of the lift ring 308 and the bottom of the top wall 202 when the swivel ram roller 100 is in the retracted position. As shown in FIGS. 5 and 6, this movement of the swivel disk 320 and the top plate 330 relative to the body 200 creates a gap 342 between the top of the top wall 202 and the bottom of the swivel disk 320. In other words, when the hydraulic cylinder 310 moves upward and the distance between the top of the lift ring 308 and the bottom of the top wall 202 becomes shorter, the distance between the top of the top wall 202 and the bottom of the swivel disk 320 becomes larger. As should be appreciated, when the bottom of the swivel disk 320 is spaced from the top of top wall 202 by the gap 342, the projections 324 at the bottom of the swivel disk 320 are disengaged from the detents 220 located on the top surface of the top wall 202. The body 200 can rotate relative to the swivel disk 320 when the projections 324 are disengaged from the detents 220.

After the top of the lift ring 308 comes into contact with the bottom of the top wall 202 and the hydraulic pressure in the hydraulic cylinder 310 continues to increase, the hydraulic cylinder 310 further extends upward. During this movement, the lift ring 308 (which is attached to the hydraulic cylinder 310) moves the body 200 upward. As shown in FIGS. 5 and 6, the body 200, including the roller assemblies 220, 224, are thus lifted off of the ground.

When the body 200 is lifted off the ground, the body 200 of the swivel ram roller 100 can be rotated around the lifting mechanism 300. The lifting mechanism 300 remains stationary as the body 200 rotates around it. When an operator rotates the body 200 about the axis 124, the operator only has to overcome frictional forces that are created by the load of the body 200 on the lift ring 308. The operator does not have to overcome the force of the load placed on the top plate 330.

In various embodiments, the body 200 is manually rotated about an axis 124 of the lifting mechanism 300 (see FIG. 5). However, as should be appreciated, the body 200 can be rotated relative to the lifting mechanism 300 by any device currently available or later developed which can perform this function.

As discussed, the projections 322 of the swivel disk 320 match and are received by the detents 220 of the top wall 202. As such, the body 200 can be rotated to any one of a plurality of positions as long the projections 322 align with the detents 220 when the lifting mechanism 300 is in the retracted position.

A description will now be provided of the transformation of the swivel ram roller 100 from the extended state, as shown in FIGS. 5 and 6, to the retracted state, as shown in FIGS. 3 and 4. When the hydraulic fluid is initially returned to the hydraulic source 400, thus reducing the hydraulic pressure in the hydraulic cylinder 310, the hydraulic cylinder 310, the body 200, the swivel disk 320 and the top plate 330 move downward until the roller assemblies 220, 224 contact the ground. Continued reduction in the hydraulic pressure in the hydraulic cylinder 310 causes the hydraulic cylinder 310, the swivel disk 320 and the top plate 330 to move downward by the height of gap 342 such that the projections 324 are received and engaged by the detents 220. When the projections 324 are engaged by the detents 220, the lifting mechanism 300 and the body 200 are placed in a fixed rotational position. Also, when the lifting mechanism 300 moves downward by the height of the gap 342, the predetermined distance 340 is created between the top of the lift ring 308 and the bottom of top wall 202.

When the hydraulic pressure in the hydraulic cylinder 310 is further reduced, the foot 302 is lifted from the ground. As should be appreciated, the force applied by the load on the top plate 330 is transferred from the hydraulic cylinder 310 and the foot 302 to the body 200 and the roller assemblies 220, 224 when the foot 302 is removed off the ground.

Figure 7:
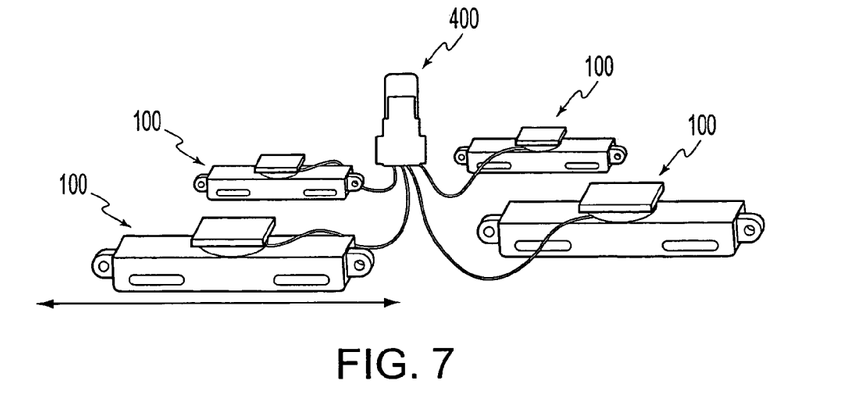
FIGS. 7-11 illustrate the repositioning of a plurality of swivel ram roller assemblies according to FIGS. 1-6.
Figure 8:
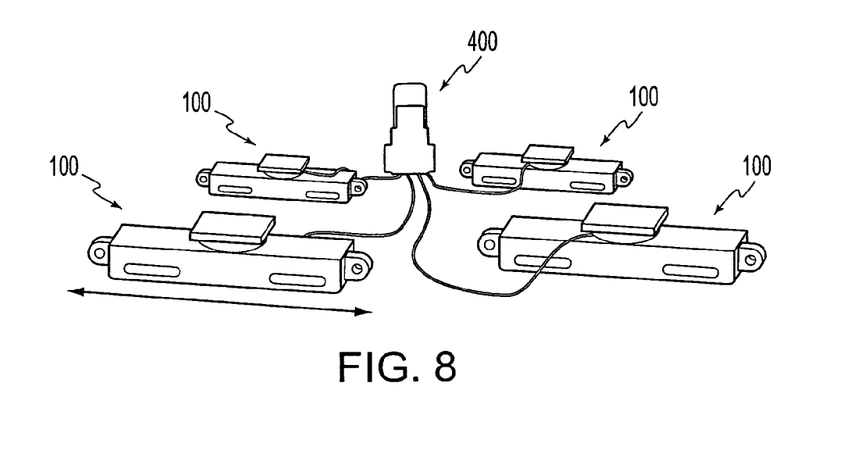
Figure 9:
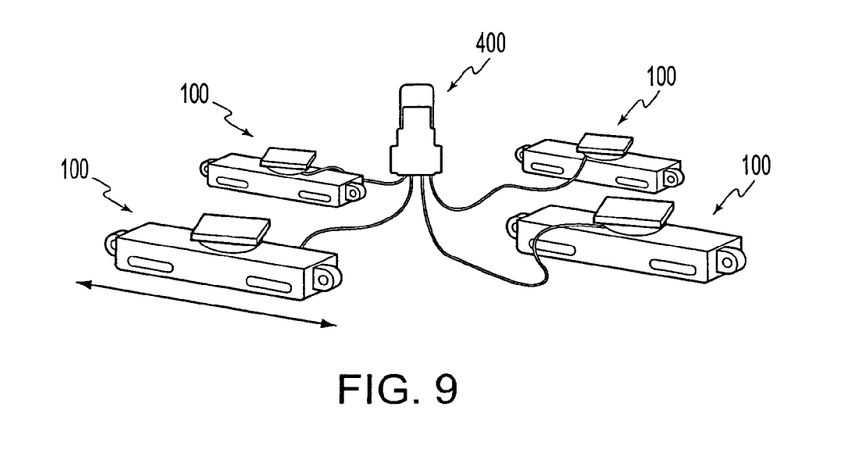
Figure 10:
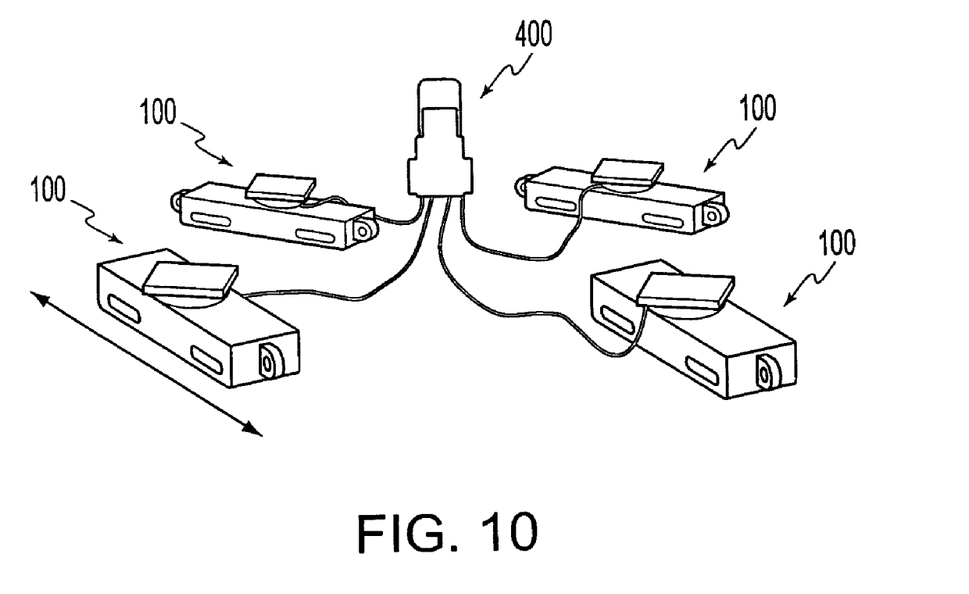
Figure 11:
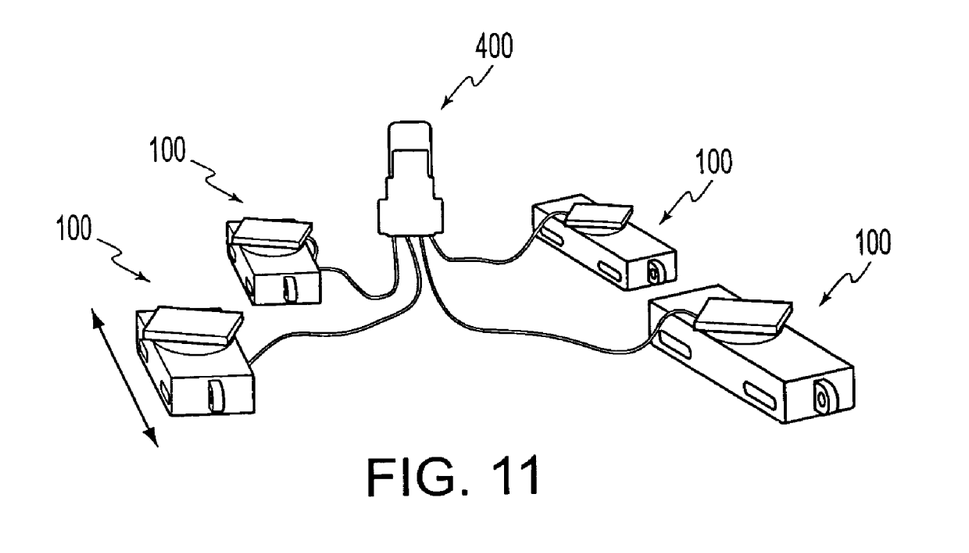

FIGS. 7-11 illustrate how the direction of travel of a plurality of swivel ram rollers 100 can be changed. FIG. 7 illustrates the plurality of swivel ram rollers 100 positioned to travel in a first direction. The hydraulic cylinders 310 of these swivel ram rollers 100 are in the retracted position, such that all of the roller assemblies 220, 224 engage the ground. To change the direction of travel of these swivel ram rollers 100, the hydraulic cylinders 310 are operated until they are in the extended position. The bodies 200 of all of the swivel ram rollers 100 can be rotated to any of various new directions of travel, as shown in FIGS. 8-11. Once the swivel ram rollers 100 are aligned in the desired new direction, the hydraulic cylinders 310 are operated to transform the swivel ram rollers 100 to their retracted state.

While the invention has been described with reference to various exemplary embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

What is claimed is:

1. A roller mechanism for transporting loads over a surface, comprising:

a body;

at least one roller assembly that permits the body to move in at least one translational direction, the roller assembly being rotatably connected to the body; and a lifting mechanism attached to the body such that the body is selectively rotatable relative to the lifting mechanism and a load when the load is placed on the roller mechanism;

wherein the lifting mechanism can be operated to lift the roller assemblies out of contact with the surface; and wherein the lifting mechanism has a retracted state and an extended state and includes a foot which is not in contact with the surface when the lifting mechanism is in the retracted state, but which contacts the surface when the lifting mechanism is in the extended state.

2. The roller mechanism of claim 1, wherein the lifting mechanism includes at least one projection and the body includes at least one detent that receives the at least one projection; and wherein the at least one projection and the at least one detent maintain the body in a fixed rotatable position relative the lifting mechanism.

3. The roller mechanism of claim 2, wherein the body is rotatable relative to the lifting mechanism when the at least one projection is not engaged with the at least one detent.

4. The roller mechanism of claim 1, wherein
the body includes a top wall; and
the lifting mechanism comprises:
a hydraulic cylinder that extends through the top wall of the body, and a structural member that (a) is attached to or integral with an outside surface of the hydraulic cylinder, (b) is below the top wall of the body and (c) selectively engages the top wall of the body.

5. The roller mechanism of claim 4, wherein the structural member contacts a lower surface of the top wall after the hydraulic cylinder extends a predetermined distance.

6. The roller mechanism of claim 5, wherein the lifting mechanism includes at least one projection and the body includes at least one detent that receives the at least one projection; wherein the at least one projection and the at least one detent maintain the body in a fixed rotatable position relative the lifting mechanism when engaged and the at least one projection is disengaged from the at least one detent when the hydraulic cylinder extends the predetermined distance.

7. The roller mechanism of claim 4, wherein the structural member is a lift ring.

8. The roller mechanism of claim 4, wherein the roller assembly is a chain roller assembly.

9. The roller mechanism of claim 1, wherein when the lifting mechanism is in the extended state, the lifting mechanism supports the body and the at least one roller assembly above the surface.

10. A roller mechanism for transporting loads over a surface, comprising:
a body;
at least one roller assembly that permits the body to move in at least one translational direction, the roller assembly being rotatably connected to the body; and
a lifting mechanism attached to the body such that the body is selectively rotatable relative to the lifting mechanism and a load when the load is placed on the roller mechanism and the lifting mechanism can be operated to lift the body and the at least one roller assembly from the surface;
wherein the lifting mechanism has a retracted state and an extended state and includes a foot which is not in contact with the surface when the lifting mechanism is in the retracted state, but which contacts the surface when the lifting mechanism is in the extended state.

11. The roller mechanism of claim 10, wherein the lifting mechanism includes at least one projection and the body includes at least one detent that receives the at least one projection; and wherein the at least one projection and the at least one detent maintain the body in a fixed rotatable position relative the lifting mechanism.

12. The roller mechanism of claim 11, wherein the body is rotatable relative to the lifting mechanism when the at least one projection is not engaged with the at least one detent.

13. The roller mechanism of claim 10, wherein
the body includes a top wall; and
the lifting mechanism comprises:
a hydraulic cylinder that extends through the top wall of the body, and a structural member that (a) is attached to or integral with an outside surface of the hydraulic cylinder, (b) is below the top wall of the body and (c) selectively engages the top wall of the body.

14. The roller mechanism of claim 13, wherein the structural member contacts a lower surface of the top wall after the hydraulic cylinder extends a predetermined distance.

15. The roller mechanism of claim 14, wherein the lifting mechanism includes at least one projection and the body includes at least one detent that receives the at least one projection; and wherein the at least one projection and the at least one detent maintain the body in a fixed rotatable position relative the lifting mechanism when engaged and the at least one projection is disengaged from the at least one detent when the hydraulic cylinder extends the predetermined distance.

16. A roller mechanism for transporting loads over a surface comprising:
a body;
at least one roller assembly that permits the body to move in a translational direction, the at least one roller assembly being rotatably connected to the body; and
a lifting mechanism having a retracted state in which the lifting mechanism does not contact the surface and an extended state in which the lifting mechanism contacts the surface and supports the body and the roller assembly above the surface;
wherein the body and the roller assembly are rotatable relative to the lifting mechanism and a load when the load is placed on the roller mechanism when the body and the roller assembly are not in contact with the surface; and
wherein the lifting mechanism includes a foot which is not in contact with the surface when the lifting mechanism is in the retracted state, but which contacts the surface when the lifting mechanism is in the extended state.

17. The roller mechanism of claim 16, wherein the lifting mechanism includes:
a hydraulic cylinder,
the foot which selectively engages the surface,
a structural member located within the body, and
a load bearing surface,
wherein the foot, structural member and load bearing surface are connected to the cylinder.

18. The roller mechanism of claim 17, wherein the structural member engages the body to raise the roller assembly above the surface.

19. A method of operating a roller mechanism on a surface, the roller mechanism having a body, at least one roller assembly for moving the body in at least one translational direction over the surface, the roller assembly being rotatably connected to the body, and a lifting mechanism, comprising the steps of:

lifting, with the lifting mechanism, a load that has been placed on the roller mechanism by a predetermined distance;

lifting, with the lifting mechanism after the load has been lifted the predetermined distance, the load, the body and the at least one roller assembly until the at least one roller assembly is out of contact with the surface; and rotating the body relative to the lifting mechanism and the load;

wherein the lifting mechanism has a retracted state and an extended state and includes a foot which is not in contact with the surface when the lifting mechanism is in the retracted state, but which contacts the surface when the lifting mechanism is in the extended state.

* * * * *